United States Patent
Kubota et al.

[11] Patent Number: 6,035,413
[45] Date of Patent: *Mar. 7, 2000

[54] DATA BACKUP APPARATUS OF A SEMICONDUCTOR MEMORY

[75] Inventors: Kazuhiko Kubota, Toyota; Jun Tokumitsu, Nishikamo-Gun, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,633

[22] Filed: Mar. 31, 1997

[30] Foreign Application Priority Data

Apr. 26, 1996 [JP] Japan ................................ 8-108183

[51] Int. Cl.$^7$ .................................................. G06F 11/00
[52] U.S. Cl. ................................... 714/6; 714/11; 714/13
[58] Field of Search ................ 395/182.04, 182.03, 395/182.05, 182.09, 182.11, 182.21; 371/10.2, 21.1; 365/201, 189.01, 189.05; 714/6, 5, 7, 11, 13, 710, 718, 41, 42

[56] References Cited

U.S. PATENT DOCUMENTS

| | | | |
|---|---|---|---|
| 3,544,777 | 12/1970 | Winkler | 714/8 |
| 4,584,663 | 4/1986 | Tanikawa | 714/49 |
| 4,601,019 | 7/1986 | Shah et al. | 365/200 |
| 4,718,038 | 1/1988 | Yoshida | 711/164 |
| 4,748,594 | 5/1988 | Iida . | |
| 4,891,791 | 1/1990 | Iijima | 365/189.01 |
| 5,079,585 | 1/1992 | Yamada | 396/301 |
| 5,109,505 | 4/1992 | Kihara | 395/182.03 |
| 5,237,687 | 8/1993 | Okamoto et al. | 395/653 |
| 5,426,609 | 6/1995 | Okuda | 365/201 |
| 5,488,702 | 1/1996 | Byers et al. | 713/200 |
| 5,504,673 | 4/1996 | Okamoto et al. | 364/187 |
| 5,586,247 | 12/1996 | Yoshifuji et al. | 714/2 |

FOREIGN PATENT DOCUMENTS

| | | |
|---|---|---|
| 0 177 690 | 4/1986 | European Pat. Off. . |
| A62-34260 | 2/1987 | Japan . |
| 6-290112 | 10/1994 | Japan . |
| A6-290112 | 10/1994 | Japan . |
| A7-192495 | 7/1995 | Japan . |

Primary Examiner—Dieu-Minh T. Le
Attorney, Agent, or Firm—Oliff & Berridge, PLC

[57] ABSTRACT

A data backup apparatus includes a semiconductor memory having a plurality of areas, each area storing a value of variables. A writing unit writes a value to a plural number of areas of the memory one by one, the plural number being at least four and even. A reading unit reads the values from the plural number of areas of the memory. A coincidence determining unit determines whether more than half of values read from the plural number of areas of the memory are the same as each other. An assigning unit determines a coincidence value when it has been determined that more than half of the read values are the same, so that the coincidence value is assigned to each variable.

19 Claims, 8 Drawing Sheets

FIG. 2

| EEPROM ADDRESS | DATA NAME |
|---|---|
| 0 | DATA No.1 |
| 1 | DATA No.1 (MIRROR DATA) |
| 2 | DATA No.2 |
| 3 | DATA No.2 (MIRROR DATA) |
| 4 | DATA No.3 |
| 5 | DATA No.3 (MIRROR DATA) |
| ... | ... |
| 28 | DATA No.15 |
| 29 | DATA No.15 (MIRROR DATA) |
| 30 | DATA No.1 |
| 31 | DATA No.1 (MIRROR DATA) |
| 32 | DATA No.2 |
| 33 | DATA No.2 (MIRROR DATA) |
| 34 | DATA No.3 |
| 35 | DATA No.3 (MIRROR DATA) |
| ... | ... |
| 58 | DATA No.15 |
| 59 | DATA No.15 (MIRROR DATA) |
| 60 | DATA No.1 |
| 61 | DATA No.1 (MIRROR DATA) |
| 62 | DATA No.2 |
| 63 | DATA No.2 (MIRROR DATA) |
| 64 | DATA No.3 |
| 65 | DATA No.3 (MIRROR DATA) |
| ... | ... |
| 88 | DATA No.15 |
| 89 | DATA No.15 (MIRROR DATA) |
| 90 ∼ 127 | AREAS FOR CHARGE PUMP CHECK |

DATA No.1 WRITTEN TO SIX 1-BYTE AREAS (6 BYTES)

DATA BACKUP APPARATUS OF A SEMICONDUCTOR MEMORY

BACKGROUND OF THE INVENTION (1) Field of the Invention

The present invention generally relates to a data backup apparatus of a semiconductor memory, and more particularly to an improvement of a data backup apparatus which executes a data backup routine to retain the latest version of stored data in a semiconductor memory even when power is turned off during writing of data to the memory.

(2) Description of the Related Art

A semiconductor memory coupled to a central processing unit (CPU) includes an array of memory cells, each storing one bit of information. When one or more memory cells of the semiconductor memory malfunction or have defectiveness, the content of the memory cell is destroyed and the stored data is lost. Practically, it is very difficult to produce a semiconductor memory in which any of the memory cells does not malfunction. In a commonly-used semiconductor memory, certain measures against the malfunction of the memory cells, such as data backup, are taken. By taking such measures to the memory, it is ensured that the contents of the memory are correct.

For example, Japanese Laid-Open Patent Application No. 7-192495 discloses an apparatus for testing a semiconductor memory. In this apparatus, the same data is stored in a plurality of memory cells of the semiconductor memory. The apparatus detects whether the values of data read out from the semiconductor device are the same. When the values of the read data are not the same, it is determined that any of the memory cells malfunctions or has defectiveness. When the values of the read data are the same, it is determined that none of the memory cells malfunctions and the stored data is correct.

A nonvolatile semiconductor memory is known which retains its contents when power is turned off. An EEPROM (Electrically Erasable Programmable Read Only Memory) is a type of the nonvolatile semiconductor memory. If data is stored in the nonvolatile semiconductor memory, the stored data can be retained regardless of whether the power is turned on or off.

Suppose that a nonvolatile semiconductor memory in a control unit is installed into an automotive vehicle. Power supplied to the memory is cut off at any time if an ignition switch of the vehicle is turned off by the vehicle operator. It is impossible to predict the timing of the turning off of the ignition switch. Occasionally, the power may be turned off when data is being written to the memory. In such a case, the contents of the memory cells to which the data is being written are incorrect or destroyed, and it is difficult to effectively retain the stored data in the memory.

In the apparatus of the above publication, the same data is written to the plural memory cells of the semiconductor memory at a time. When the semiconductor memory of the above publication is installed into an automotive vehicle, it is possible that the power be turned off when the data is being written to the memory cells of the semiconductor memory. In such a case, the contents of the memory cells to which the data is being written will be incorrect, and the stored data will be lost.

Accordingly, it is difficult that the apparatus of the above publication effectively retains the stored data in the memory when the power is turned off during the writing of data to the memory.

SUMMARY OF THE INVENTION

An object of the present invention is to provide an improved data backup apparatus of a semiconductor memory in which the above-described problems are eliminated.

Another object of the present invention is to provide a data backup apparatus which effectively retains the latest version of stored data in a semiconductor memory even when power is turned off during writing of renewed data to the semiconductor memory.

The above-mentioned objects of the present invention are achieved by a data backup apparatus which comprises: a semiconductor memory which has a plurality of areas, each area storing a value of variables; a writing unit which writes a value to a plural number of areas of the memory one by one, the plural number being at least four and even; a reading unit which reads the values from the plural number of areas of the memory; a coincidence determining unit which determines whether more than half of values read from the plural number of areas of the memory are the same as each other; and an assigning unit which determines a coincidence value when the coincidence determining unit has determined that more than half of the read values are the same, so that the coincidence value is assigned to each variable.

According to the present invention, it is possible to prevent the stored data from being destroyed or lost even when power is turned off during writing of renewed data to the memory. It is possible to effectively retain the latest version of the stored data in the memory even when the power is turned off during the writing of the renewed data to the memory.

BRIEF DESCRIPTION OF THE DRAWINGS

Other objects, features and advantages of the present invention will become more apparent from the following detailed description when read in conjunction with the accompanying drawings in which:

FIG. 2 is a diagram showing an address map of an EEPROM of the system of FIG. 1;

DETAILED DESCRIPTION OF THE PREFERRED EMBODIMENT

A description will now be given of the preferred embodiment of the present invention with reference to the accompanying drawings.

Figure 1:
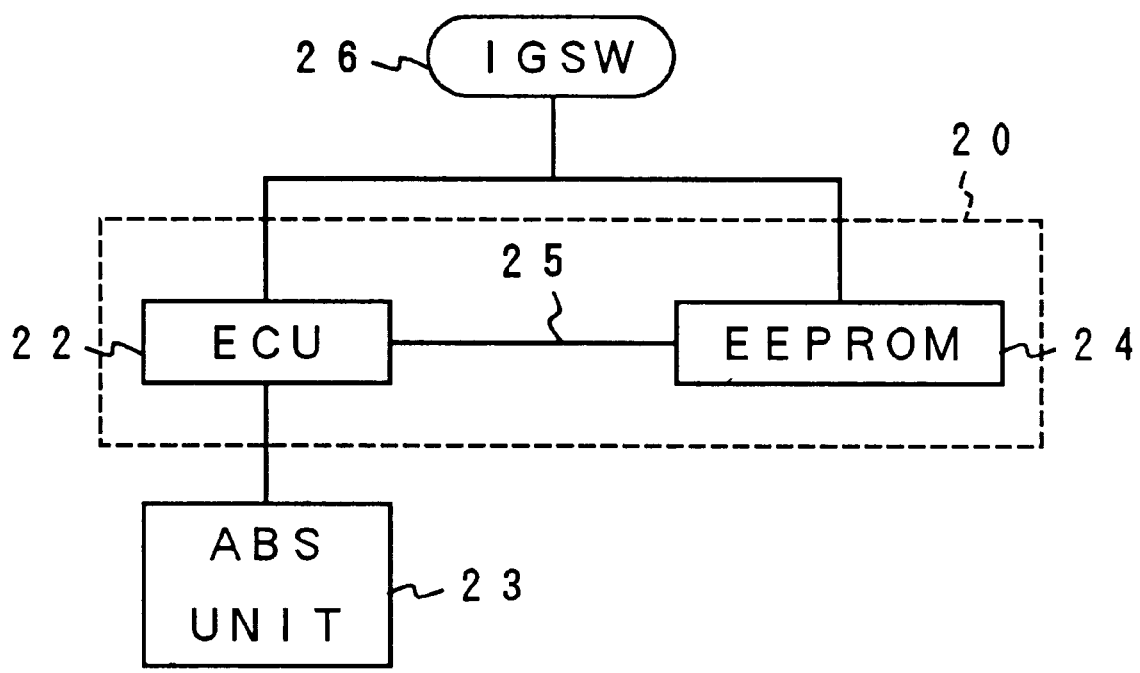
FIG. 1 is a block diagram showing a system to which one embodiment of the present invention is applied.

FIG. 1 shows an ABS (Antilock Brake System) control system to which one embodiment of the present invention is applied. The ABS control system is provided on an automotive vehicle, and it carries out an ABS control to prevent the locking of the vehicle wheels when an excessively great braking force is exerted on the vehicle wheels.

As shown in FIG. 1, the ABS control system 20 includes an ECU (electronic control unit) 22. The ECU 22 transmits a command to an ABS unit 23, and the ABS control of the ABS unit 23 is carried out by the ECU 22.

In the ABS control system 20 of FIG. 1, the ECU 22 has an internal memory (for example, a random access memory RAM) which stores a plurality of ABS parameters used when carrying out the ABS control. The ABS parameters are stored as a set of fifteen 1-byte data items in the internal memory of the ECU 22. For example, the ABS parameters include: data items indicating a diagnostic code as a result of malfunction detection of the ABS unit 23; data items indicating ABS control wheel-speed correction coefficients; data items indicating an ABS control test-mode data, and so on.

In the ABS control system 20, an EEPROM 24 is connected to the ECU 22 via a serial bus 25. The EEPROM 24 of the present embodiment is capable of storing at least 128×8 bits (or 128 bytes) of information. The EEPROM 24 is a special type of programmable read-only memory that can be erased by exposing it to an electrical charge.

Further, in the ABS control system, an IGSW (ignition switch) 26 of the vehicle is connected to both the ECU 22 and the EEPROM 24. When the IGSW 26 is turned ON, power is supplied to the ECU 22 and the EEPROM 24. When the IGSW 26 is turned off, the power supplied to the ECU 22 and the EEPROM 24 is cut. When the power is turned off, the contents (the ABS parameters) of the internal memory of the ECU 22 are deleted immediately. However, the EEPROM 24 retains its contents (the ABS parameters) even when the power is turned off.

During the ABS control of the ABS unit 23 or during a function test of the ABS unit 23, any of the ABS parameters in the EEPROM 24 may be renewed or rewritten. It is necessary that, when the IGSW 26 is turned off and then turned on to start performing the ABS control procedure, the latest ABS parameters, renewed during a previous cycle of the ABS control, be stored in the EEPROM 25. For this purpose, a backup routine is executed by the ECU 22, and the latest ABS parameters from the ECU 22 are transferred to the EEPROM 24 so that the latest ABS parameters are stored in the EEPROM 24. If the backup routine is correctly performed, when the IGSW 26 is turned off and then turned on, the latest ABS parameters in the EEPROM 24 are retained.

More specifically, the backup routine is executed by the ECU 22 as follows. Immediately after the IGSW 26 is turned on, the ECU 22 reads out the parameters from the EEPROM 24. During the ON state of the IGSW 26, a verify check as to whether the contents of the stored data in the EEPROM 24 are correct is performed at intervals of a given time. This verify check is performed by detecting that the values of the data written to memory cells of the EEPROM 24 are the same as the values of the parameters read out from the memory cells of the EEPROM 24. In addition, when one of the parameters is renewed during the ABS control, the ECU 22 transfers the renewed parameter to the EEPROM 24 so that the renewed parameter is stored in the EEPROM 24 immediately.

FIG. 2 shows an address map of the EEPROM 24 which defines specific addresses of the EEPROM 24 to which the ABS parameters are written.

In the ABS control system of FIG. 1, even if the EEPROM 24 retains the contents of the stored data, any of the memory cells of the EEPROM 24 may malfunction. It is necessary that the contents of the parameters in the EEPROM 24 always be backed up. For safety of the parameters in the EEPROM 24, each data item of the parameters is written to a plurality of different addresses of the EEPROM 24.

As described above, the ABS parameters are stored in the EEPROM 24. In FIG. 2, the parameters in the EEPROM 24 are indicated by "DATA NO.1", "DATA NO.2", . . . , and "DATA NO.15" respectively. Each of the parameters in the EEPROM 24 is a 1-byte data item and stored in six 1-byte areas of the EEPROM 24 which are different addresses of the EEPROM 24.

In the above-described embodiment, as shown in FIG. 2, the 1-byte data item of the DATA No. 1 (the first of the data items of the parameters) is written to six 1-byte areas of the EEPROM 24. That is, an original bit pattern of the DATA NO.1 (including 8 bits of data) is written to three addresses 0, 30 and 60 of the EEPROM 24, and a reverse bit pattern of the DATA NO.1 (including 8 bits of data) is written to three addresses 1, 31 and 61 of the EEPROM 24, as indicated by shaded portions in FIG. 2. The original bit pattern includes 8 bits of the stored data item without bit flipping thereof. The reverse bit pattern includes 8 bits of the stored data after a bit flipping or reversing of the original bit pattern is performed.

For the sake of convenience, the three areas of the EEPROM 24 to which the original bit pattern of the DATA NO.1 is written are indicated by "D0", "D30" and "D60", and the three areas of the EEPROM 24 to which the reverse bit pattern of the DATA NO.1 is written are indicated by "D1", "D31" and "D61". In addition, the data of the DATA NO.1 written to the addresses 0, 30 and 60 (even integers) of the EEPROM 24 is called the original data, and the data of the DATA NO.1 written to the addresses 1, 31 and 61 (odd integers) of the EEPROM 24 is called the mirror data. The mirror data has the reverse bit pattern, and the reverse bit pattern includes bits which are respectively reverse to the bits of the original bit pattern.

Similarly, in the EEPROM 24 of FIG. 2, the data item of each of the DATA No. 2 through DATA NO.15 is written to six areas of the EEPROM 24. That is, the original bit pattern of each data item of the DATA NO.2 through the DATA NO.15 is written to addresses (2n–2), (30+2n–2) and (60+2n–2) of the EEPROM 24 where n is an integer from 2 to 15, and the reverse bit pattern of each data item of the DATA NO.2 through the DATA NO.15 is written to addresses (2n–1), (30+2n–1) and (60+2n–1) of the EEPROM 24.

In the EEPROM 24 of FIG. 2, the original data and the mirror data of each of the DATA NO.1 through DATA NO.15 are alternately written to the EEPROM 24 in ascending order of the addresses of the EEPROM 24. The original data and the mirror data of each of the DATA NO.1 through the DATA NO.15 are stored in the addresses 0–29 of the EEPROM 24, the addresses 30–59 of the EEPROM 24, and the addresses 60–89 of the EEPROM 24. Accordingly, the original data Dn of the n-th data item is written to the three addresses (2n–2), (30+2n–2) and (60+2n–2) of the EEPROM 24 where n is an integer from 1 to 15, and the mirror data Mn of the n-th data item is written to the three addresses (2n–1), (30+2n–1) and (60+2n–1) of the EEPROM 24.

Generally, a malfunction in memory cells of the EEPROM at successive addresses thereof is apt to occur. When such a malfunction has occurred, the values of data read out from the memory cells of the EEPROM may be always the value "11h" (or "00h") regardless of what values of data are written to the memory cells of the EEPROM. If the value "11h" (or "00h") is written to the memory cells of the EEPROM 24 in the case of such a malfunction, the verify check to detect whether the written value is the same as the value of the data read out from the memory cells of the EEPROM 24 does not produce a correct result of the detection of the malfunction.

In the EEPROM 24 of the above-described embodiment, the original data and the mirror data for one data item of the same parameter are stored in the two successive addresses of the EEPROM 24. The bits of the reverse bit pattern of the mirror data and the bits of the original bit pattern of the original data at the two successive addresses of the EEPROM 24 are reverse to each other. Therefore, even when a malfunction in the memory cells of the EEPROM 24 at successive addresses thereof has occurred, the reliability to correctly detect the occurrence of such a malfunction in the EEPROM 24 of the present embodiment is ensured.

In the EEPROM 24 of the above-described embodiment, the original data and the mirror data for each of the data items of the parameters are stored in the addresses 0–29 of the EEPROM 24, the addresses 30–59 of the EEPROM 24, and the addresses 60–89 of the EEPROM 24. When a malfunction in the memory cells of the EEPROM 24 at successive addresses thereof has occurred, the possibility that more than half of the data items of the original data at three different addresses of the EEPROM 24 and the data items of the mirror data at three different addresses of the EEPROM 24 be destroyed is remarkably reduced. Therefore, the reliability of the data backup function to effectively retain the stored data in the EEPROM 24 is ensured.

Figure 3:
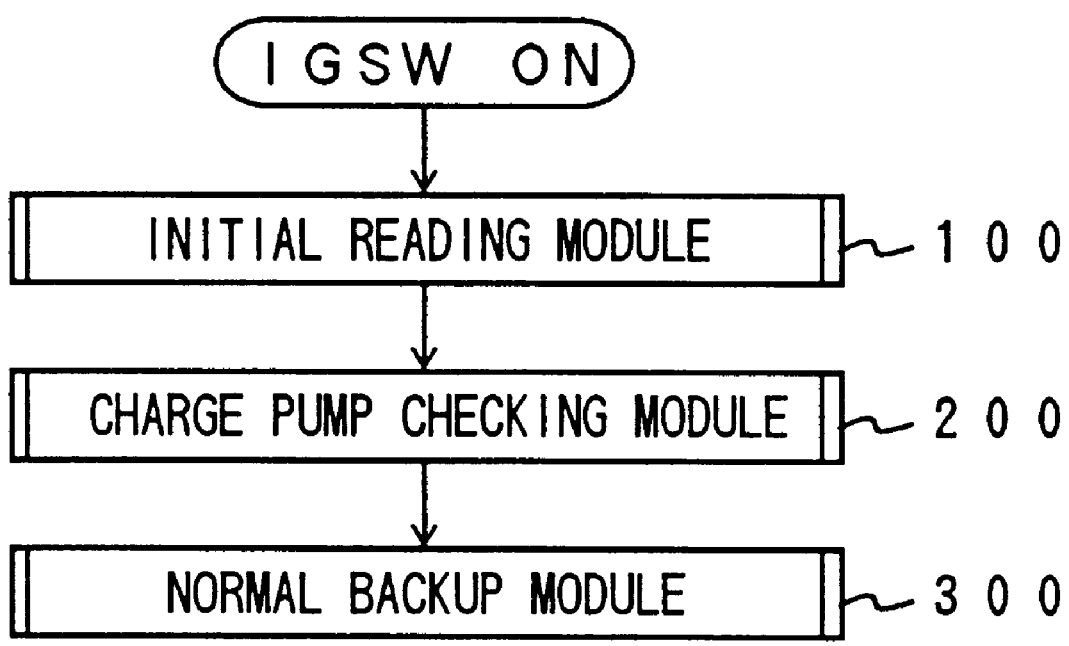
FIG. 3 is a flowchart for explaining a main backup routine executed by a control unit of the system of FIG. 1.

FIG. 3 shows a main backup routine executed by the ECU 22 of the ABS control system of FIG. 1. As described above, in order to back up the contents of the parameters in the ECU 22 into the EEPROM 24, the ECU 22 executes the main backup routine of FIG. 3. Immediately after the IGSW 26 is turned on, the ECU 22 starts executing the main backup routine. The main backup routine of FIG. 3 continues to run until the IGSW 26 is turned off.

As shown in FIG. 3, the main backup routine includes an initial reading module 100, a charge pump checking module 200, and a normal backup module 300 which are performed in this order.

When the execution of the main backup routine of FIG. 3 is started upon the ON state of the IGSW 26, the initial reading module 100 is first executed by the ECU 22.

Figure 4:
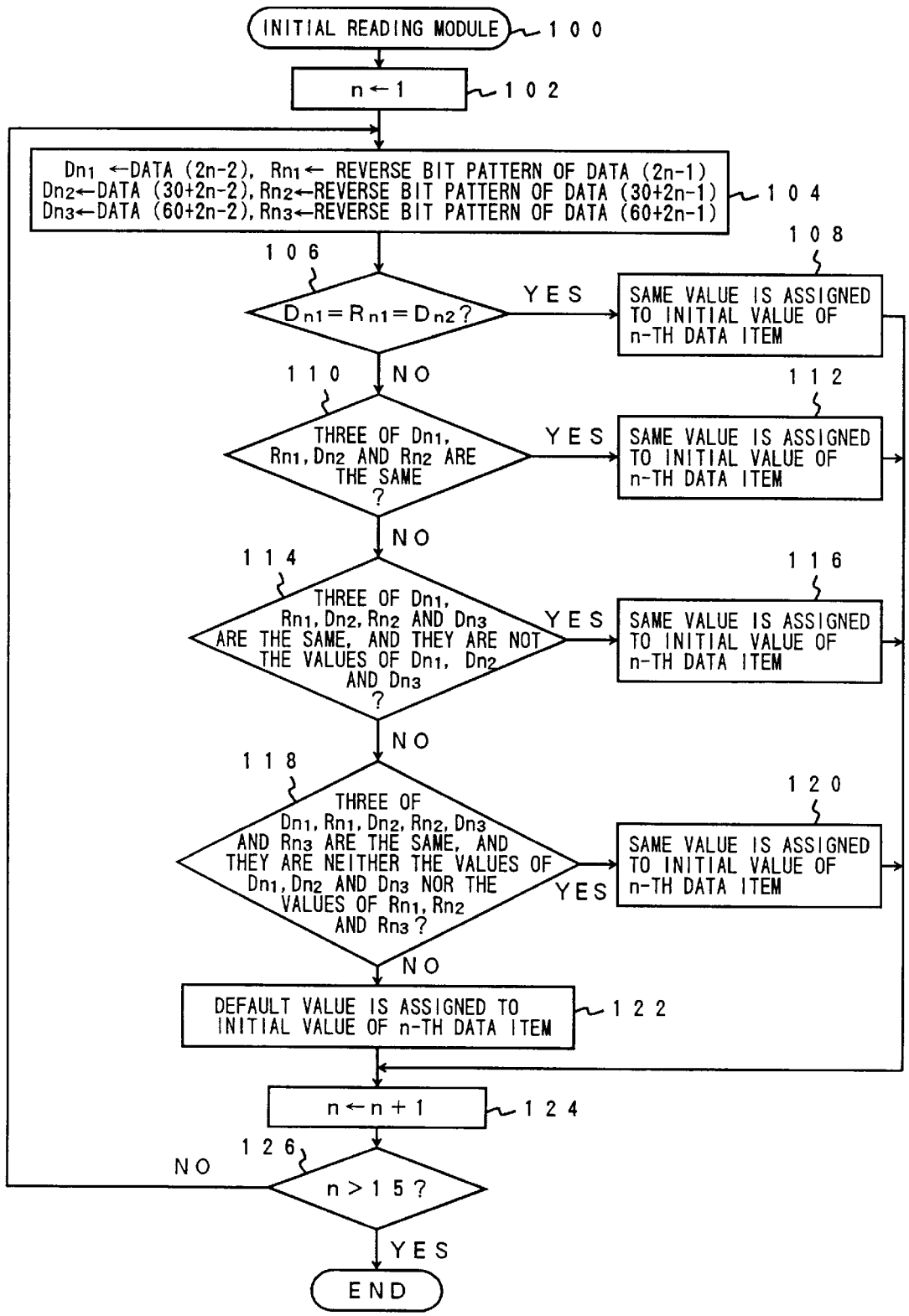
FIG. 4 is a flowchart for explaining an initial reading module of the main backup routine of FIG. 3.

FIG. 4 shows the initial reading module 100 of the main backup routine of FIG. 3. In the initial reading module 100 of FIG. 4, values of the parameters are read out from the EEPROM 24, and the read values are assigned to the ECU 22.

As shown in FIG. 4, the ECU 22 at step 102 assigns the value "1" to a variable "n" (n<--1). The variable "n" indicates an identification number (or the DATA NO.) of the n-th data item of the fifteen data items of the ABS parameters in the EEPROM 24.

Step 104 reads out the data item (which is either the original data or the mirror data) from each of the addresses (2n−2), (2n−1), (30+2n−2), (30+2n−1), (60+2n−2) and (60+2n−1) of the EEPROM 24, and transfers the read data to variables Dn1, Rn1, Dn2, Rn2, Dn3 and Rn3, respectively. The reading of the data items from the EEPROM 24 and the transferring of the read data to the variables in the ECU 22 is performed in ascending order of the addresses of the EEPROM 24.

In the step 104, a bit flipping of the reverse bit pattern of each of the mirror data read out from the addresses (2n−1), (30+2n−1) and (60+2n−1) of the EEPROM 24 is performed again after the reading. The original bit pattern (or the double-reverse bit pattern) of each of the respective read data is reconstructed and transferred to the variables Rn1, Rn2 and Rn3. Therefore, all the variables Dn1, Rn1, Dn2, Rn2, Dn3 and Rn3 after the step 104 contain the original bit pattern of the respective read data.

After the step 104 is performed, step 106 is performed. Step 106 detects whether the values of the variables Dn1, Rn1 and Dn2 among the six variables Dn1, Rn1, Dn2, Rn2, Dn3 and Rn3 are the same (Dn1=Rn1=Dn2).

When the result at the step 106 is affirmative, it is determined that the same value of the three variables Dn1, Rn1 and Dn2 indicates a correct backup value of the n-th data item in the EEPROM 24. Step 108 assigns the same value of the variables Dn1, Rn1 and Dn2 to an initial value of a variable in the ECU 22 for the n-th data item.

On the other hand, when the result at the step 106 is negative, step 110 is performed. Step 110 detects whether three of the values of the four variables Dn1, Rn1, Dn2 and Rn2 are the same.

When the result at the step 110 is affirmative, it is determined that the same value of the three variables indicates the correct backup value of the n-th data item in the EEPROM 24. Step 112 assigns the same value of the three variables to the initial value of the variable in the ECU 22 for the n-th data item.

On the other hand, when the result at the step 110 is negative, step 114 is performed. Step 114 detects whether three of the values of the five variables Dn1, Rn1, Dn2, Rn2 and Dn3 are the same, and they are not the values of the variables (Dn1, Dn2 and Dn3). As described above, the variables (Dn1, Dn2 and Dn3) indicate the original data of the n-th data item in the EEPROM 24.

When the result at the step 114 is affirmative, it is determined that the same value of the three variables indicates the correct backup value of the n-th data item in the EEPROM 24. Step 116 assigns the same value of the three variables to the initial value of the variable in the ECU 22 for the n-th data item.

On the other hand, when the result at the step 114 is negative, step 118 is performed. Step 118 detects whether three of the values of the six variables Dn1, Rn1m Dn2, Rn2, Dn3 and Rn3 are the same, and they are neither the values of the variables (Dn1, Dn2 and Dn3) nor the values of the variables (Rn1, Rn2 and Rn3). As described above, the variables (Rn1, Rn2 and Rn3) indicate the mirror data of the n-th data item in the EEPROM 24.

When the result at the step 118 is affirmative, it is determined that the same value of the three variables indicates the correct backup value of the n-th data item in the EEPROM 24. Step 120 assigns the same value of the three variables to the initial value of the variable in the ECU 22 for the n-th data item.

On the other hand, when the result at the step 118 is negative, it is determined that the values of the data items read out from the six addresses of the EEPROM 24 are not the correct backup value of the n-th data item in the EEPROM 24. Step 122 assigns a default value (for example, 00h) to the initial value of the variable in the ECU 22 for the n-th data item.

As described above, when a malfunction in memory cells of the EEPROM at successive addresses thereof has occurred, the values of data read out from the memory cells of the EEPROM may be always the value "11h" (or "00h") regardless of what values of data are written to the memory cells of the EEPROM. If the value "11h" (or "00h") is written to the memory cells of the EEPROM 24 in the case of such a malfunction, the verify check to detect whether the written value is the same as the value of the data read out from the memory cells of the EEPROM 24 does not produce a correct result of the detection of the malfunction.

In the above steps 114 and 118, even when three of the values of the variables are the same, the same value of the three variables is not assigned to the initial value in the ECU 22 if they are the values of the variables (Dn1, Dn2 and Dn3) or the values of the variables (Rn1, Rn2 and Rn3). That is, in the above described embodiment, only when the three variables the values of which are the same include one or two variables of the original data as well as one or two variables of the mirror data, the same value of the three variables is assigned to the initial value in the ECU 22. Therefore, the determination as to whether the value of data read out from the EEPROM 24 is the correct backup data in the EEPROM 24 can be made with a high level of accuracy.

After one of the steps 108, 112, 116, 120 and 122 is performed, step 124 is performed. Step 124 increments the variable "n" (n<--n+1).

After the step 124 is performed, step 126 detects whether the value of the variable "n" is greater than 15. When the result at the step 126 is affirmative, it is determined that the reading of the data items from the EEPROM 24 and the transferring of the read data to the variables in the ECU 22 are completed for all the data items of the parameters in the EEPROM 24. At this time, the initial reading module 100 is finished.

On the other hand, when the result at the step 126 is negative, the above steps 104 through 124 for the remaining data items of the parameters in the EEPROM 24 are repeated.

In the EEPROM 24 of the above-described embodiment, the values of the variables Dn1, Rn1, Dn2, Rn2, Dn3 and Rn3 are stored in the addresses (2n−2), (2n−1), (30+2n−2), (30+2n−1), (60+2n−2) and (60+2n−1) of the EEPROM 24 in this order. In the initial reading module 100 of FIG. 4, the reading of the data from the EEPROM 24 and the transferring of the read data to the variables in the ECU 22 is performed in ascending order of the addresses of the EEPROM 24. Further, the writing of the data item of the renewed parameter to the corresponding six areas of the EEPROM 24 is performed in ascending order of the addresses of the EEPROM 24, which will be described later.

In the above-described embodiment, suppose that the IGSW 26 is abruptly turned off during the normal backup routine 300 in which the writing of the value of the renewed data item to the six areas of the EEPROM 24 is performed. In such a case, the values of the variables Dn1, Rn1 and Dn2 of the renewed data item, for example, may be written to the EEPROM 24, but the values of the variables Rn2, Dn3 and Rn3 may not be written to the EEPROM 24 due to the OFF state of the IGSW 26. Thus, the previous values of the variables Rn2, Dn3 and Rn3 remain in the EEPROM 24. As described above, the reading of the data from the EEPROM 24 and the transferring of the read data to the variables in the ECU 22 is performed in ascending order of the addresses of the EEPROM 24. Further, the detection as to whether three of the values of the variables Dn1, Rn1, Dn2, Rn2, Dn3 and Rn3 are the same is performed in ascending order of the addresses of the EEPROM 24, as in the above steps 106, 110, 114 and 118. Therefore, it is possible that the same value of the three variables Dn1, Rn1 and Dn2 of the renewed data item, read out from the EEPROM 24, be assigned to the initial value of the variable in the ECU 22 for the n-th data item in the above case.

After the initial reading module 100 is finished, the charge pump checking module 200 is executed by the ECU 22. A charge pump is provided within the EEPROM 24, and the charge pump supplies an electrical charge to the EEPROM 24 when erasing and rewriting data to any of the memory cells of the EEPROM 24 is needed. Therefore, when a malfunction in the charge pump of the EEPROM 24 has occurred, it is impossible to erase or rewrite data to the EEPROM 24.

Figure 5:
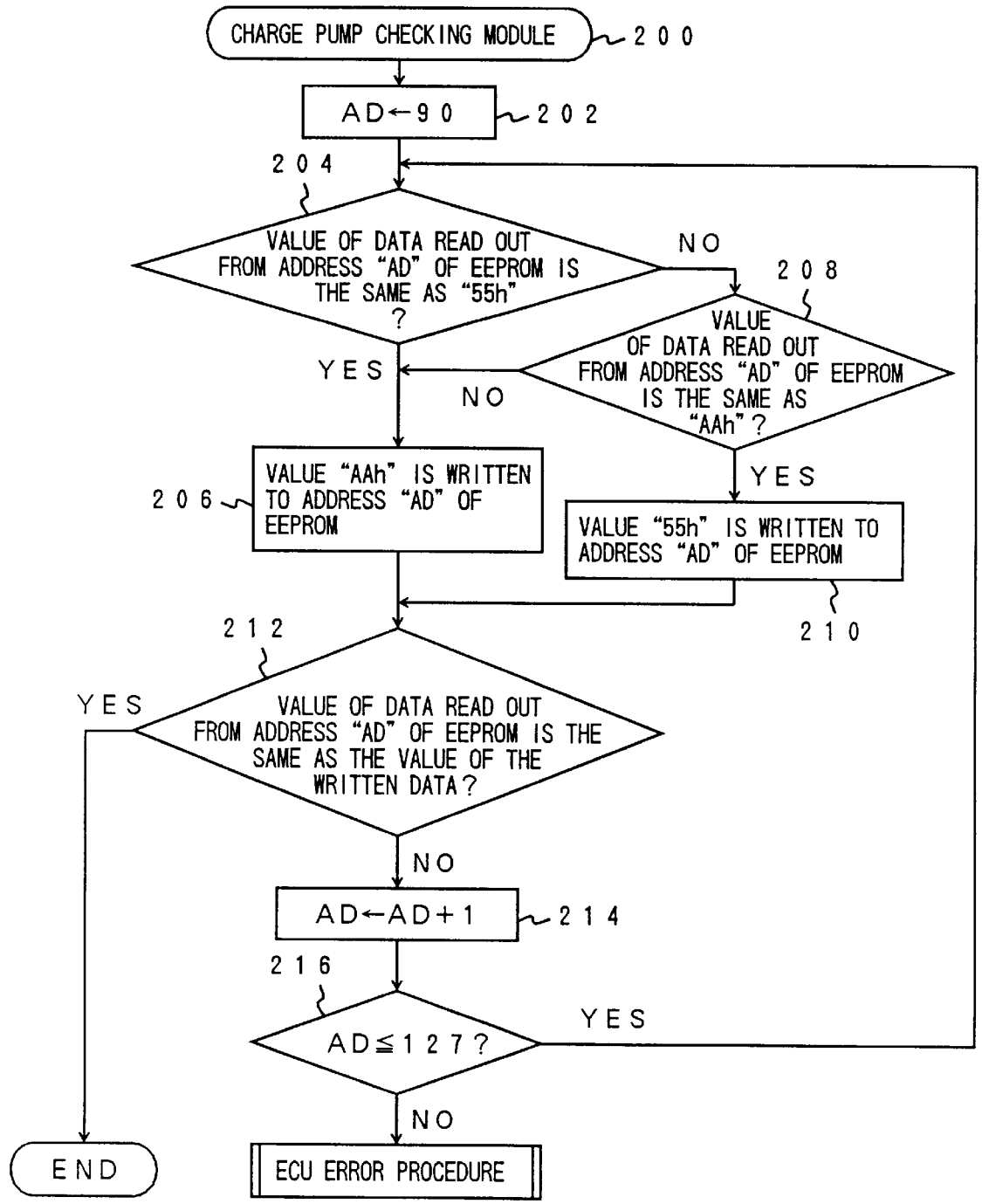
FIG. 5 is a flowchart for explaining a charge pump checking module of the main backup routine of FIG. 3.

FIG. 5 shows the charge pump checking module 200 of the main backup routine of FIG. 3. In the charge pump checking module 200 of FIG. 5, predetermined values are first written to areas (the addresses 90–127) of the EEPROM 24 for the charge pump checking, and then it is detected whether the values read out from the EEPROM 24 are the same as those written to the EEPROM 24. When the read-out values are detected as being the same as the written values, it is determined that no malfunction in the charge pump of the EEPROM 24 occurs.

As shown in FIG. 5, the ECU 22 at step 202 assigns the value 90 to a variable "AD" (AD<--90). The variable AD indicates a specific address of the EEPROM 24. In the step 202, the variable AD indicates the starting address of the EEPROM 24 in the areas for the charge pump checking.

After the step 202 is performed, step 204 is performed. Step 204 detects whether the value of data read out from the address (indicated by the variable AD) of the EEPROM 24 is the same as the value "55h".

When the result at the step 204 is affirmative, step 206 is performed. Step 206 writes the value "AAh" to the address (indicated by the variable AD) of the EEPROM 24.

On the other hand, when the result at the step 204 is negative, step 208 is performed. Step 208 detects whether the value of data read out from the address (indicated by the variable AD) of the EEPROM 24 is the same as the value "AAh".

When the result at the step 208 is affirmative, step 210 is performed. Step 210 writes the value "55h" to the address (indicated by the variable AD) of the EEPROM 24.

On the other hand, when the result at the step 208 is negative, the above step 206 is performed. Therefore, each time the IGSW 26 is turned on and the charge pump checking module 200 is performed, the value "AAh" and the value "55h" are alternately written to the EEPROM 24. The bits of the bit pattern of the value "AAh" are reverse to the bits of the bit pattern of the value "55h". Thus, in the steps 206 and 210, the value "1" and the value "0" are alternately written to the memory cells of the EEPROM 24. The reliability to correctly detect whether a malfunction in the charge pump of the EEPROM 24 has occurred is ensured.

After the step 206 or the step 210 is -performed, step 212 is performed. Step 212 detects whether the value of data read out from the address (indicated by the variable AD) of the EEPROM 24 again is the same as the value of the data written to the EEPROM 24 in the step 206 or the step 210.

When the result at the step 212 is affirmative, it is determined that no malfunction in the charge pump of the EEPROM 24 has occurred. An acknowledge signal indicating that the charge pump of the EEPROM 24 is normally operating is transmitted to the ECU 22, and the charge pump checking module 200 is finished.

On the other hand, when the result at the step 212 is negative, it is determined that a malfunction in the charge pump of the EEPROM 24 has occurred. Step 214 increments the variable AD (AD<--AD+1). After the step 214 is performed, step 216 is performed. Step 216 detects whether the value of the variable AD is smaller than or equal to the value 127. When the variable AD is equal to 127, the variable AD indicates the final address of the EEPROM 24 in the areas for the charge pump checking.

When the result at the step 216 is affirmative, the above steps 204 through 216 are repeated for the remaining areas of the EEPROM 24. On the other hand, when the result at the step 216 is negative, it is determined that a malfunction in the charge pump of the EEPROM 24 has occurred and the values of data read out from the charge pump checking areas of the EEPROM 24 are not the same as the values of data written to the areas of the EEPROM 24. When the charge pump of the EEPROM 24 malfunctions, the backup function to back up the contents of the parameters in the ECU 22 into the EEPROM 24 cannot be correctly performed. At this time, an error signal indicating that a malfunction in the charge pump of the EEPROM 24 has occurred is transmitted to the ECU 22. The main backup routine is finished (or an abnormal end), and an ECU error procedure is performed.

Figure 6:
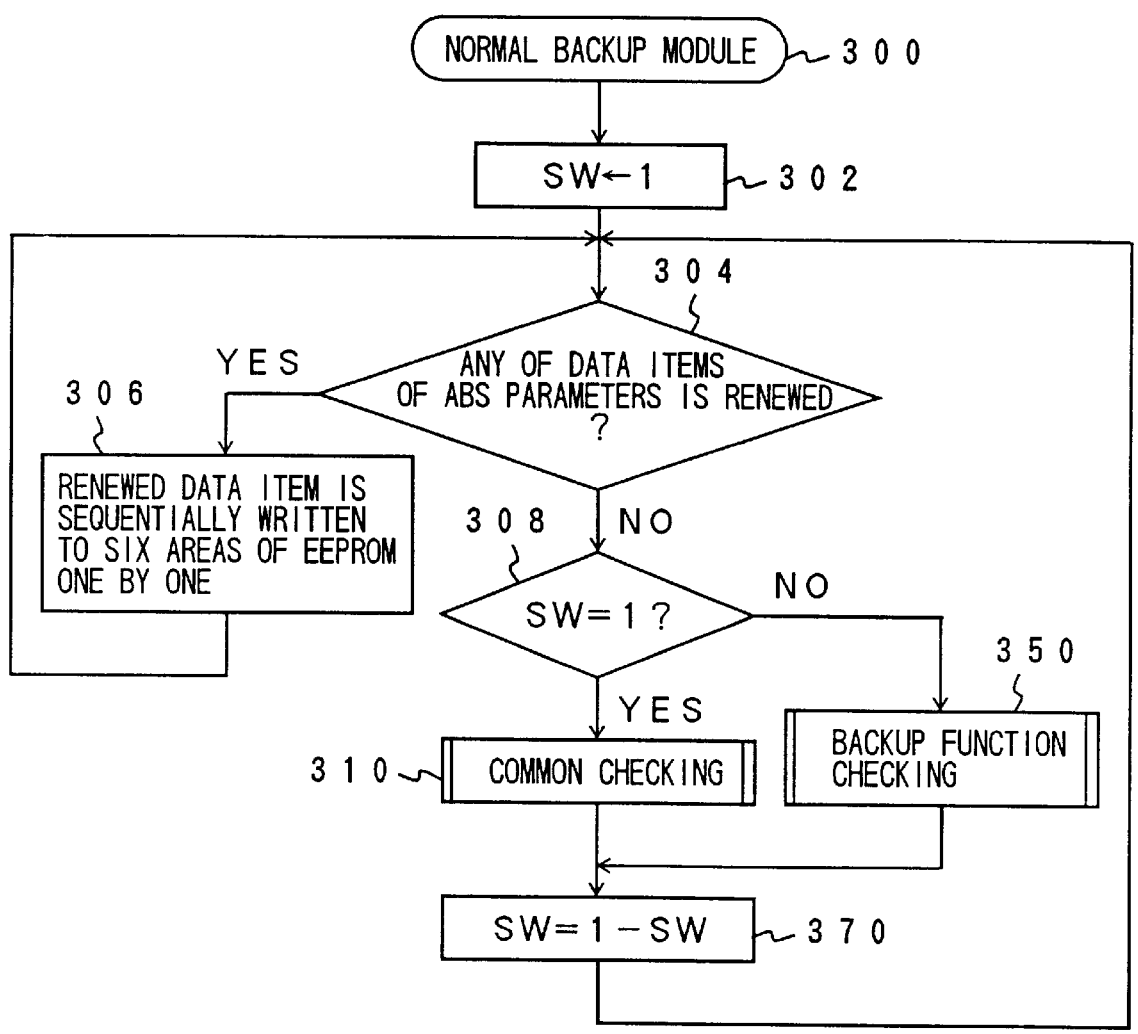
FIG. 6 is a flowchart for explaining a normal backup module of the main backup routine of FIG. 3.

After the charge pump checking module 200 is finished, the normal backup module 300 is executed by the ECU 22. FIG. 6 shows the normal backup module 300 of the main backup routine of FIG. 3.

As shown in FIG. 6, the ECU 22 at step 302 assigns the value "1" to a flag SW (SW<--1). The flag SW indicates which of the common checking sub-module 310 and the backup function checking sub-module 350 is to be performed in the normal backup module 300.

After the step 302 is performed, step 304 is performed. Step 304 detects whether any of the data items of the ABS parameters in the ECU 22 is renewed.

As described above, when the ABS control of the ABS unit 23 is carried out, any of the data items of the ABS parameters may be renewed. The ECU 22 executes the main backup routine of FIG. 3 and the ABS control routine in parallel and independently of each other. If any of the data items of the ABS parameters is renewed during the ABS control routine, a signal indicating the occurrence of the renewed data item is transmitted to the ECU 22. The detection at the step 304 as to whether any of the data items of the ABS parameters is renewed is performed based upon this signal.

When the result at the step 304 is affirmative, step 306 is performed. Step 306 sequentially writes the renewed data item to the six areas of the EEPROM 24 one by one in ascending order of the addresses of the EEPROM 24. As shown in FIG. 2, in the step 306, the value (the original data or the mirror data) of the renewed data item is written to the six areas of the EEPROM 24 one by one in ascending order of the addresses of the EEPROM 24. In the present embodiment, by the writing of the renewed data item to the EEPROM 24, the six previous values for a specific one of the fifteen data items (the DATA NO.1 through DATA NO.15) stored in the EEPROM 24 are renewed or rewritten by the renewed data item.

For example, when it is detected at the step 304 that the m-th data item (where m is an integer between 1 and 15) of the ABS parameters is renewed, the value (the original data Dm) of the renewed data item is written to the addresses (2m–2), (30+2m–2) and (60+2m–2) of the EEPROM 24, and the value (the mirror data Rm) of the renewed data item is written to the addresses (2m–1), (30+2m–1) and (60+2m–1) of the EEPROM 24 in the step 306.

The writing of the renewed data item (one byte) to the EEPROM 24 is performed each time a write command is transmitted to the EEPROM 24 via the serial bus 25. Generally, when a write command is transmitted to the EEPROM 24, a plurality of data items (or several bytes of information) can be written to the EEPROM 24 at the same time. In order to increase the speed of the writing of data to the EEPROM 24, it is desirable that several bytes of information of the renewed data item be simultaneously written to the EEPROM 24 when a write command is transmitted to the EEPROM 24. However, if the IGSW 26 is abruptly turned off during the writing of several bytes of information to the EEPROM 24, the power supplied to the EEPROM 24 is abruptly cut and all the bytes of the data written to the EEPROM 24 may be destroyed. Therefore, in the above case, it is difficult to correctly back up the contents of the parameters in the ECU 22 into the EEPROM 24.

In the above-described embodiment, the value of the renewed data item is written to the six different areas of the EEPROM 24 one by one in ascending order of the addresses of the EEPROM 24. That is, one byte of information of the renewed data item is written to the EEPROM 24 each time a write command is transmitted to the EEPROM 24. Therefore, the number of bytes of the renewed data item which may be incorrectly written to the EEPROM 24 even when the IGSW 26 is turned off during the writing of the renewed data item to the EEPROM 24 is reduced to one.

For example, suppose a case in which the IGSW 26 is turned off when the value (the mirror data Rm) of the renewed data item is being written to the address (30+2m–1) of the EEPROM 24 in the above-described embodiment. Although the data written to the address (30+2m–1) of the EEPROM 24 may be incorrect, the data written to the addresses (2m–2), (2m–1) and (30+2m–2) of the EEPROM 24 is the correct backup value of the renewed data item. As described above, the reading of the data from the EEPROM 24 and the transferring of the read data to the variables in the ECU 22 is performed in ascending order of the addresses of the EEPROM 24. Further, the detection as to whether three of the values of the variables Dn1, Rn1, Dn2, Rn2, Dn3 and Rn3 are the same is performed in ascending order of the addresses of the EEPROM 24. Therefore, when any error of the values written to the addresses (2m–2), (2m–1) and (30+2m–2) of the EEPROM 24 has not occurred, it is possible that, when the IGSW 26 is turned off and then turned on to start performing the main backup routine, the latest version of the parameters, which were renewed during the previous cycle of the ABS control, be stored as the initial value in the EEPROM 25.

Further, suppose another case in which the IGSW 26 is turned off when the value (the original data Dm) of the renewed data item is being written to the address (2m–2) of the EEPROM 24 in the above-described embodiment. The values of the data written to the addresses (2m–1), (30+2m–2), (30+2m–1), (60+2m–2) and (60+2m–1) of the EEPROM 24 at this time remain unchanged and they are the values of the previously renewed data item during a previous cycle of the main backup routine. Since the current cycle of the main backup routine in the present case abnormally ends due to the turning-off of the IGSW 26, the reliability of the data backup function to effectively retain the stored data in the EEPROM 24 is ensured.

The main backup routine of FIG. 3 and the ABS control routine are executed by the ECU 22 independently of each other, and the vehicle operator is not involved in the execution of the main backup routine. Therefore, there is no problem in the above-described embodiment even if the speed of the writing becomes slow by writing the value of the renewed data item to the six areas of the EEPROM 24 one by one.

After the step 306 is performed, the step 304 is repeated. When the result at the step 304 is negative, it is determined that none of the data items of the ABS parameters is renewed. At this time, step 308 is performed. Step 308 detects whether the value of the flag SW is equal to 1.

When the result at the step 308 is affirmative, step 310 (a common checking sub-module) is performed. On the other hand, when the result at the step 308 is negative, step 350 (a backup function checking sub-module) is performed.

Figure 7:
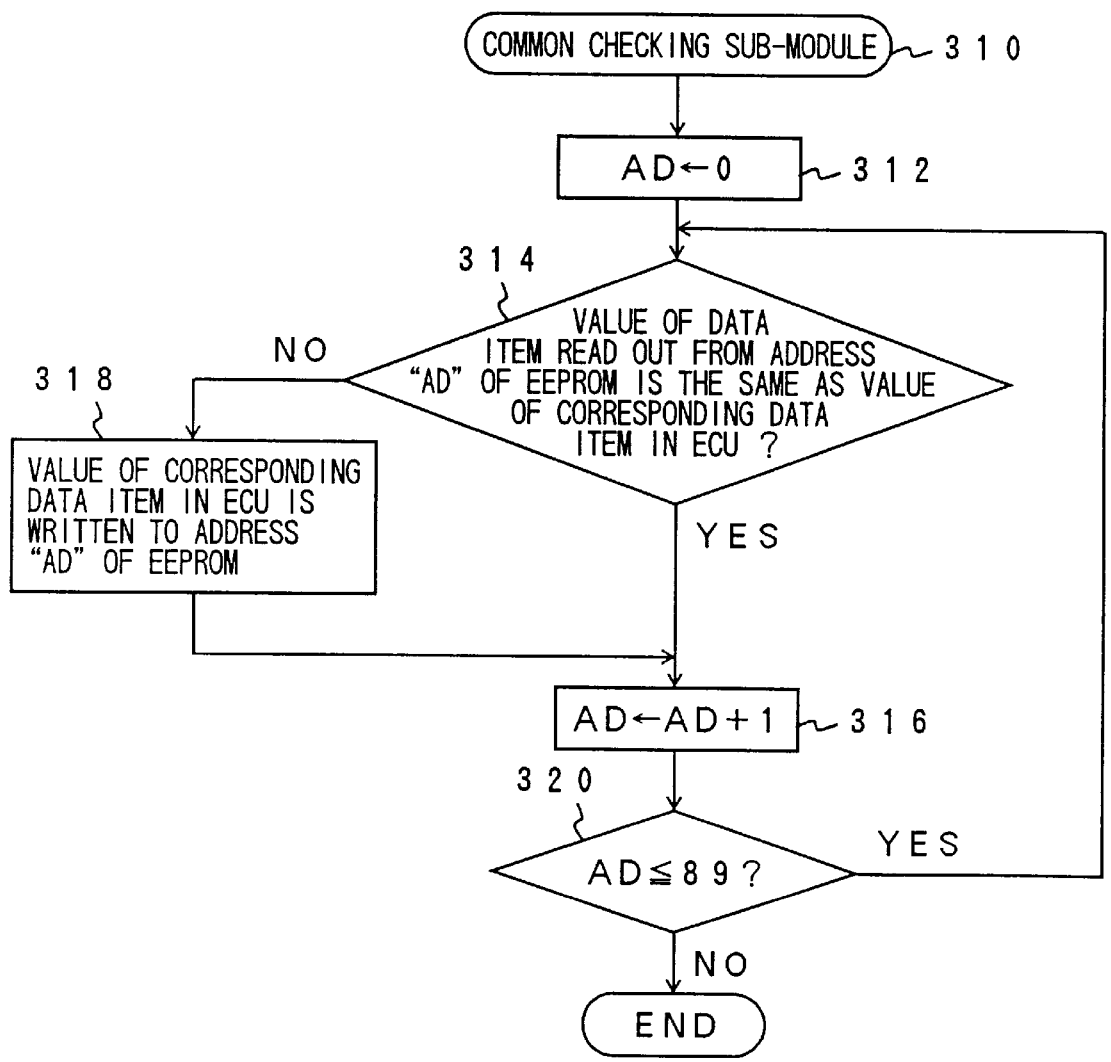
FIG. 7 is a flowchart for explaining a common checking sub-module of the normal backup module of FIG. 6.

FIG. 7 shows the common checking sub-module 310 of the normal backup module of FIG. 6. In the common checking sub-module 310, it is detected whether an error of the stored data has occurred due to a malfunction in the memory cells of the EEPROM 24, and a trial writing to correct the error of the stored data in the EEPROM 24 is performed.

As shown in FIG. 7, the ECU 22 at step 312 assigns the value "0" to the variable "AD". In the step 312, the variable AD indicates the starting address of the EEPROM 24 in the areas storing the data items of the ABS parameters.

After the step 312 is performed, step 314 detects whether the value of the data item read out from the address (indicated by the variable AD) of the EEPROM 24 is the same as the value of a corresponding data item stored in the ECU 22.

When the result at the step 314 is affirmative, it is determined that the value of the read data is the correct backup value of the data item in the EEPROM 24. At this time, step 316 is performed and a trail writing to correct an error of the stored data in the EEPROM 24 at that address is not performed. Step 316 increments the variable AD (AD<--AD+1).

On the other hand, when the result at the step 314 is negative, it is determined that an error of the stored data in the EEPROM 24 at that address has occurred. At this time, step 318 is performed. Step 318 performs a trial writing of the value (stored in the ECU 22) to the address of the EEPROM 24 in order to correct the error of the stored data in the EEPROM 24 at that address.

In the step 318, the value of the corresponding data item stored in the ECU 22 is written to the address (indicated by the variable AD) of the EEPROM 24. If the error of the stored data has occurred due to a temporary abnormal condition such as noises not a malfunction in the memory cells of the EEPROM 24, the error of the stored data is corrected by the writing of the step 318.

After the step 318 is performed, the above step 316 is performed. In the step 316, the variable AD is incremented (AD<--AD+1). After the step 316 is performed, step 320 is performed. Step 320 detects whether the address of the EEPROM 24 indicated by the variable AD is smaller than or equal to the value 89. The value 89 indicates the final address of the EEPROM 24 in the areas storing the data items of the ABS parameters.

When the result at the step 320 is affirmative, the above steps 314, 316 and 318 are repeated. On the other hand, when the result at the step 320 is negative, it is determined that the detection as to whether an error of the stored data in the EEPROM 24 at the addresses 0 through 89 is finished. At this time, the common checking sub-module 310 of FIG. 7 is finished.

Figure 8:
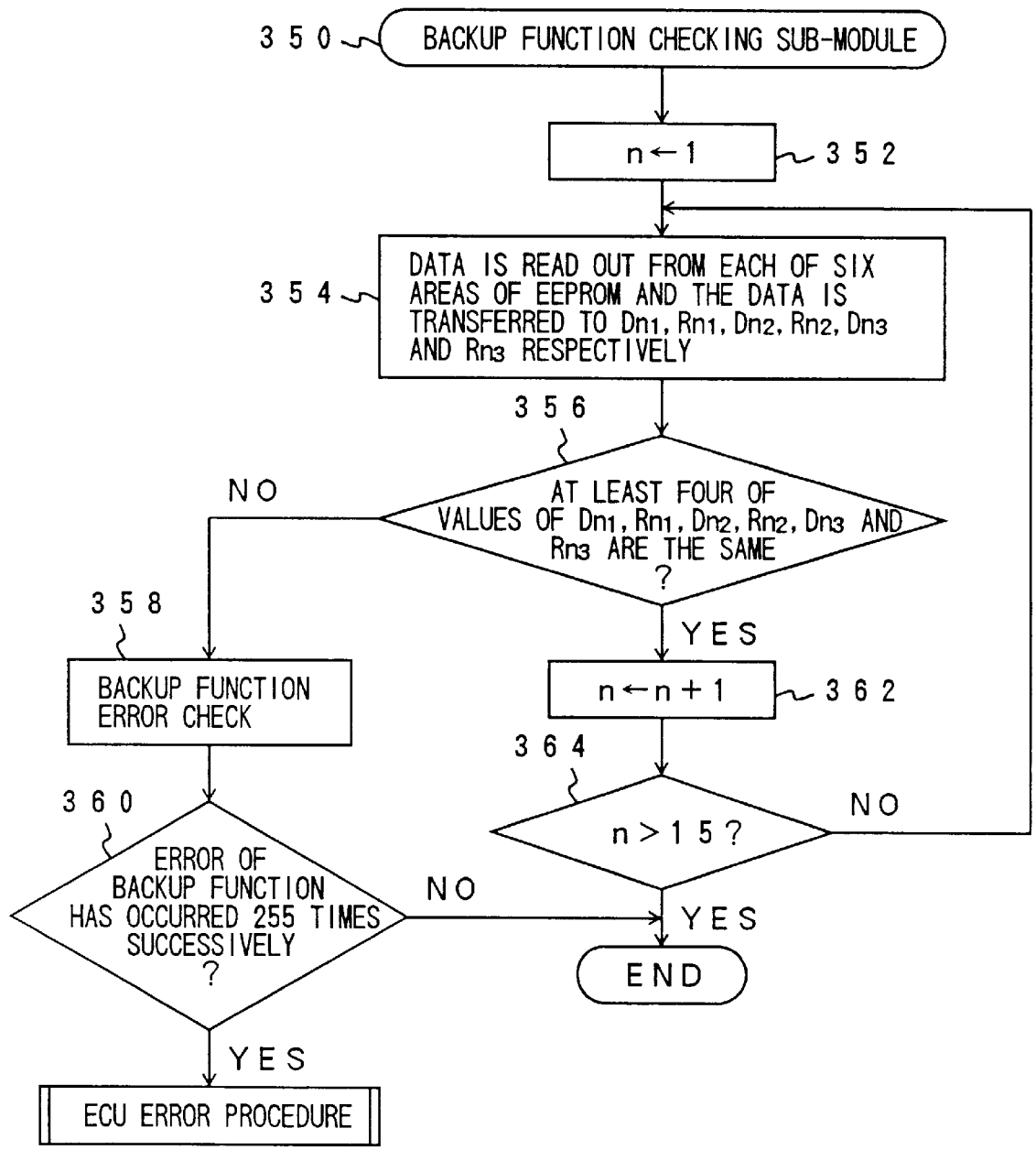
FIG. 8 is a flowchart for explaining a backup function checking sub-module of the normal backup module of FIG. 6.

FIG. 8 shows the backup function checking sub-module 350 of the normal backup module of FIG. 6. In the backup function checking sub-module 350, it is detected whether the backup function to back up the contents of the ABS parameters in the ECU 22 into the EEPROM 24 can be correctly performed by the EEPROM 24.

As described above, in the initial reading module 100, when at least three of the values of the six variables Dn1, Rn1, Dn2, Rn2, Dn3 and Rn3 are the same and they include both the original data and the mirror data, the same value is assigned to the initial value of the corresponding data item in the ECU 22. If at least four of the values of the six variables are the same, the requirement condition that at least three of the values of the six variables Dn1, Rn1, Dn2, Rn2, Dn3 and Rn3 are the same and they include both the original data and the mirror data is met.

In the backup function checking sub-module 350 of FIG. 8, when at least four of the values of the six variables Dn1, Rn1, Dn2, Rn2, Dn3 and Rn3 are not the same, it is determined that an error of the backup function of the EEPROM 24 has occurred.

As shown in FIG. 8, the ECU 22 at step 352 assigns the value "1" to the variable "n" (n<--1). In the step 352, the variable "n" indicates the identification number (or the DATA NO.) of the n-th data item of the ABS parameters in the EEPROM 24.

After the step 352 is performed, step 354 reads out the n-th data item (which is either the original data Dn or the mirror data Mn) from each of the six addresses (2n-2), (2n-1), (30+2n-2), (30+2n-1), (60+2n-2) and (60+2n-1) of the EEPROM 24, and transfers the read data to the six variables Dn1, Rn1, Dn2, Rn2, Dn3 and Rn3, respectively.

In the step 354, a bit flipping of the reverse bit pattern of each of the mirror data Mn read out from the addresses (2n-1), (30+2n-1) and (60+2n-1) of the EEPROM 24 is performed again after the reading. The original bit pattern of each of the respective read data is reconstructed and transferred to the variables Rn1, Rn2 and Rn3. Therefore, all the variables Dn1, Rn1, Dn2, Rn2, Dn3 and Rn3 after the step 354 contain the original bit pattern of each the respective read data.

After the step 354 is performed, step 356 is performed. Step 356 detects whether at least four of the values of the variables Dn1, Rn1, Dn2, Rn2, Dn3 and Rn3 for the n-th data item are the same.

When the result at the step 356 is negative (it is detected that at least four of the values of the six variables are not the same), steps 358 and 360 are performed. Step 358 carries out a backup function error check which indicates an error of the backup function of the EEPROM 24 has occurred at a time. Step 360 detects whether the error of the backup function has occurred 255 times successively. That is, it is detected whether the backup function check at the step 358 results in the detection of the occurrence of the error at 255 times successively.

When the result at the step 360 is affirmative, it is determined that the backup function of the EEPROM 24 is lost and the backup function cannot be correctly performed by the EEPROM 24. At this time, an error signal indicating that the error of the backup function of the EEPROM 24 has occurred is transmitted to the ECU 22. The backup function checking sub-module 350 of FIG. 8 is finished (or the abnormal end), and the ECU error procedure is performed.

On the other hand, when the result at the step 360 is negative, it is determined that the backup function of the EEPROM 24 is not yet lost. At this time, the backup function checking sub-module 350 of FIG. 8 is finished and no further procedure is performed.

Even when the backup function of the EEPROM 24 is lost, the default value is assigned to the initial value of each of the respective data items in the ECU 22 at the step 122 in the initial reading module 100. It is possible for the ECU 22 to carry out the ABS control procedure although the backup function is not correctly performed by the EEPROM 24. Since the vehicle operator is not involved in the execution of the main backup routine, the backup function checking sub-routine 350 makes a determination that the backup function of the EEPROM 24 is lost when it is detected that the error of the backup function has occurred 255 times successively. Therefore, in the above-described embodiment, the determination of the correctness of the backup function of the EEPROM 24 is carefully made.

When the result at the step 356 is affirmative (it is detected that at least four of the values of the six variables are the same), it is determined that the same value is the correct backup value of the n-th data item in the EEPROM 24. At this time, steps 362 and 364 are performed. Step 362 increments the variable "n" (n<--n+1). Step 364 detects whether the value of the variable "n" is greater than 15. The value 15 indicates the final data item of the ABS parameters in the EEPROM 24.

When the result at the step 364 is affirmative, it is determined that the backup function for all the data items of the ABS parameters can be correctly performed by the EEPROM 24. At this time, the backup function checking sub-module 350 of FIG. 8 is finished and no further procedure is performed.

When the result at the step 364 is negative, the above steps 354–363 are repeated.

Referring back to FIG. 6, after one of the common checking sub-module 310 and the backup function checking sub-module 350 is finished, step 370 is performed. Step 370 reverses the value of the flag SW by performing a computation according to the equation: SW=1−SW. That is, if the value of the flag SW is equal to 1, the step 370 reverses the value of the flag SW to 0. If the value of the flag SW is equal to 0, the step 370 reverses the value of the flag SW to 1.

After the step 370 is performed, the above-described steps 304–308, 310 and 350 are repeated. Therefore, the ECU 22 continues to execute the common checking sub-module 310 and the backup function checking sub-module 350 in an alternate manner until the IGSW 26 is turned off. On the other hand, when the IGSW 26 is turned off, the normal backup module 300 of FIG. 6 is finished.

From the foregoing description, it is readily understood that the data backup apparatus of the present invention is constituted by: the EEPROM 24, as shown in FIG. 2, having a plurality of areas, each area storing one of a set of data items as a unit; a reading unit which reads a value from each area of the EEPROM 24 with respect to a particular one of the data items and assigns the value to at least four variables one by one, the number of the variables being even; a writing unit which sequentially writes a coincidence value to at least four areas of the EEPROM 24 one by one in accordance with the variables, the number of the areas being even; a coincidence determining unit which determines whether more than half of values read from the areas of the EEPROM 24 are the same as each other; and an assigning unit which determines the coincidence value when the coincidence determining means has determined that more than half of the read values are the same, so that the coincidence value is assigned to each of the variables.

In the above-mentioned data backup apparatus of the present invention, the reading unit is constituted by the initial reading module 100 of FIG. 4 which is executed by the ECU 22. The writing unit is constituted by the normal backup module 300 and the step 306 of FIG. 6 which are executed by the ECU 22. The coincidence determining unit is constituted by the steps 104, 106, 110, 114 and 118 of FIG. 4 which are executed by the ECU 22. The assigning unit is constituted by the steps 108, 112, 116 and 120 of FIG. 4 which are executed by the ECU 22.

Suppose that a renewed data item is sequentially written to only three areas of the EEPROM 24 one by one for a particular one of the data items, and the power is turned off during the writing of the renewed data item to the second one of the three areas of the EEPROM 24. The latest version of the data item is read from the first one of the three areas of the EEPROM 24, but, as a result of the power off, an incorrect value is read from the second one of the three areas of the EEPROM 24, and the previous version of the data item is read from the third one of the three areas of the EEPROM 24.

In the above example of the three-area-written case, it is determined that more than half of the three values read from the EEPROM 24 are not the same, and no coincidence value is assigned to each of the variables. Thus, no coincidence value is subsequently written to the EEPROM 24. However, the latest version of the data item is stored in the first one of the three areas of the EEPROM 24, and the previous version of the data item is stored in the third one of the three areas of the EEPROM 24. In the above example, it is difficult to effectively retains the latest version of stored data in the EEPROM 24 when the power is turned off during the writing of the renewed data item.

On the other hand, according to the above-mentioned embodiment of the present invention, the writing unit sequentially writes a coincidence value to at least four areas of the EEPROM 24 one by one, the renewed data item renewing at least four values for a particular one of the data items, and the number of the area is even. Even when the power is turned off during the writing of any value of the renewed data item to the EEPROM 24, more than half of the latest values of the data item or more than half of the previous values of the data item are read from at least four areas of the EEPROM 24. The coincidence determining unit determines that more than half of the read values are the same as each other. Thus, the assigning unit assigns the coincidence value (the latest version or the previous version) to each of the variables, and the coincidence value is written to the EEPROM 24. Therefore, it is possible to effectively retain the latest version of the stored data in the EEPROM 24 even when the power is turned off during the writing of the renewed data item to the EEPROM 24.

Since the writing unit of the present invention sequentially writes a renewed data item to at least four areas of the EEPROM 24 one by one, it is possible to effectively prevent the stored data from being destroyed or lost even when power is turned off during writing of the renewed data item to the EEPROM 24.

Further, the present invention is not limited to the above-described embodiment, and variations and modifications may be made without departing from the present invention.

What is claimed is:

1. A data backup apparatus, comprising:
 a semiconductor memory having a plurality of independently addressable areas;
 a writing unit for writing a first data value to at least four and even number of areas of the independently addressable areas, the writing unit writing the first data value in the four areas one independently addressable area at a time;

a reading unit for reading second data values from the four areas;

coincidence determining means for determining whether more than half of the second data values read from the four areas have a same value; and assigning means for determining a coincidence value when said coincidence determining means has determined that more than half of the second data values are the same value and assigning the coincidence value to an output of the reading unit.

2. The apparatus according to claim 1, wherein not more than two addresses of the at least four areas are successive.

3. The apparatus according to claim 1, wherein said reading unit serially reads the second data values from the at least four areas in an ascending order of addresses of the four areas and the writing unit sequentially writing the first data value to the four areas in an ascending order of addresses of the independently addressable areas.

4. The apparatus according to claim 1, further comprising detecting means for detecting where a particular data item of a set of data items is renewed, wherein the writing unit writes the particular data item to the at least four areas corresponding to the particular data item of the areas of the memory when said detecting means has detected that the particular data item is renewed.

5. The apparatus according to claim 1, further comprising default value assigning means for assigning a default value to the output of the reading unit when said coincidence determining means has determined that more than half of the second data values are not the same.

6. The apparatus according to claim 1, further comprising common checking means for detecting whether a value read from the at least four areas of the memory is the same as a corresponding first data value when it is detected that none of first data values corresponding to a set of data items is renewed.

7. A data backup apparatus comprising:

a non-volatile semiconductor memory having a plurality of areas, each area storing a value of variables;

a writing unit for writing a value to a plural number of areas of the memory one by one, the plural number being at least four and even;

a reading unit for reading the values from the plural number of areas of the memory;

coincidence determining means for determining whether more than half of values read from the plural number of areas of the memory are the same as each other; and assigning means for determining a coincidence value when said coincidence determining means has determined that more than half of the read values are the same, so that the coincidence value is assigned to each variable;

wherein each of a first half of the read values has an original bit pattern, and each of a second half of the read values from the non-volatile memory has a reverse bit pattern, and wherein said coincidence determining means determines that more than half of the read values are the same as each other when it is detected that the original bit pattern for the first half of the read values and a double reversed bit pattern for the second half of the read values coincide with each other and that the read values include at least one value having the original bit pattern and at least one value having the double reversed bit pattern.

8. A data backup apparatus, comprising:

a semiconductor memory;

a writing unit that writes first data values to the memory at different addresses of the memory;

a reading unit that reads second data values from the memory at the different addresses;

coincidence determining device that determines whether more than half of the second data values read from the memory have a same value; and assigning device that assigns the same value to an output of the reading unit when more than half of the second data values are the same value.

9. The apparatus of claim 8, a number of different addresses being at least four.

10. The apparatus of claim 8, a number of different addresses being an even number.

11. The apparatus of claim 8, at most two of the different addresses are consecutive.

12. The apparatus of claim 8, all the first data values have a same value, the writing unit writing the first data values to a first half of the different addresses and writing one's complement of the first data values to a second half of the different addresses, the coincidence determining device one's complementing second data values read from the second half of the different addresses before determining whether more than half of the second data values have the same value.

13. The apparatus of claim 8, the writing and reading units writing and reading the first and the second data values from the different addresses in an ascending order.

14. A method for backing up data, comprising:

writing first data into a memory at different addresses;

reading second data from the different addresses;

generating a coincidence condition when more than half of the second data have a same value; and assigning the same value as an output value of the reading step if the coincidence condition is generated.

15. The method of claim 14, wherein a number of different addresses is at least four.

16. The method of claim 14, wherein a number of different addresses is an even number.

17. The method of claim 14, at most two of the different addresses are consecutive.

18. The method of claim 14, wherein all the first data values have a same value, the method further comprising:

writing the first data values to a first half of the different addresses;

writing one's complement of the first data values to a second half of the different addresses;

one's complementing second data values read from the second half of the different addresses before determining whether more than half of the second data values have the same value.

19. The method of claim 14, further comprising writing and reading the first and the second data values from the different addresses in an ascending order.

* * * * *